Dec. 9, 1930.  J. J. McBRIDE  1,784,460
VALVE ASSEMBLY
Filed May 14, 1928   2 Sheets-Sheet 1
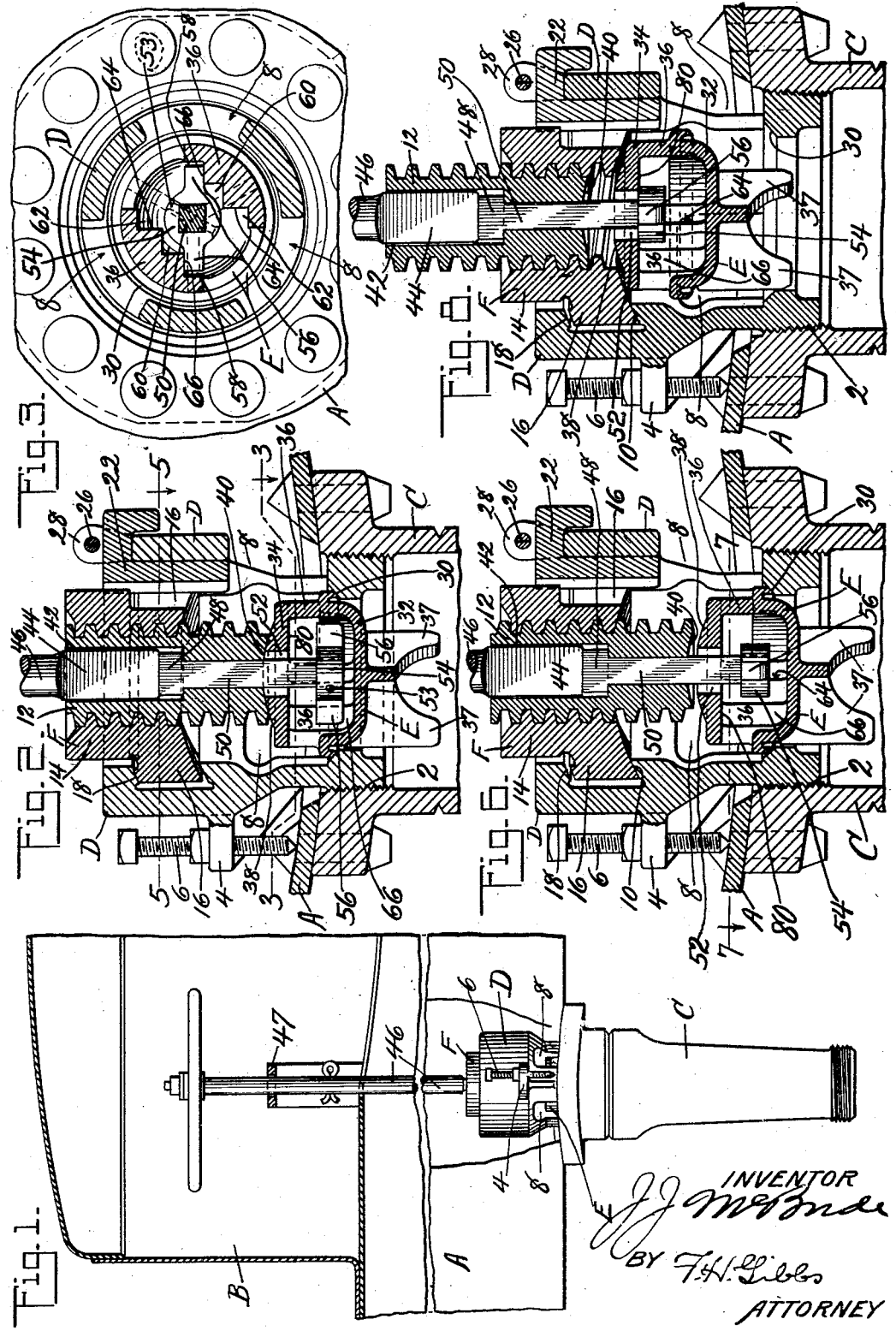

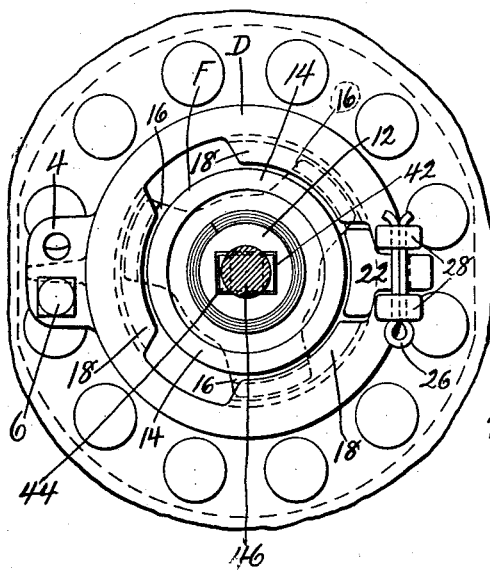
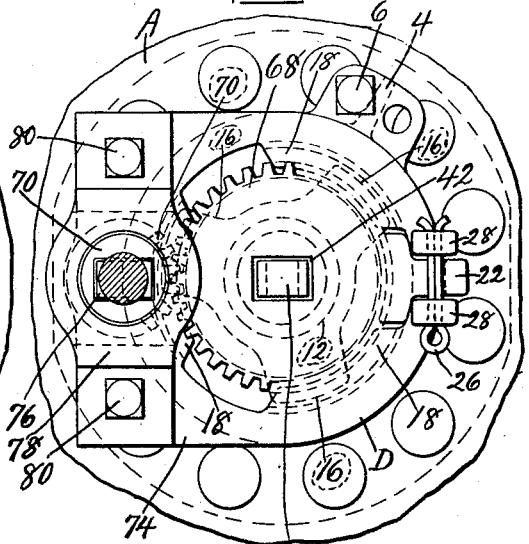
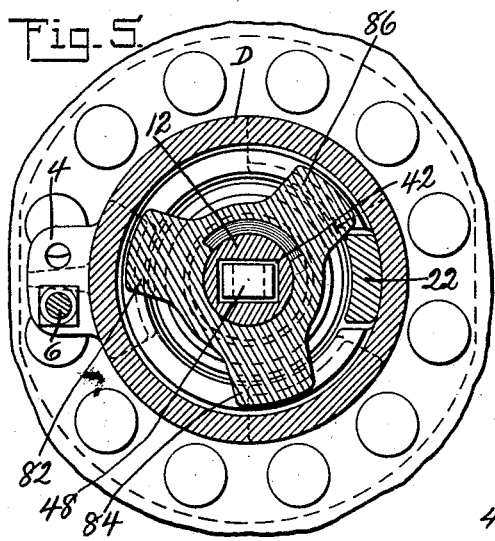
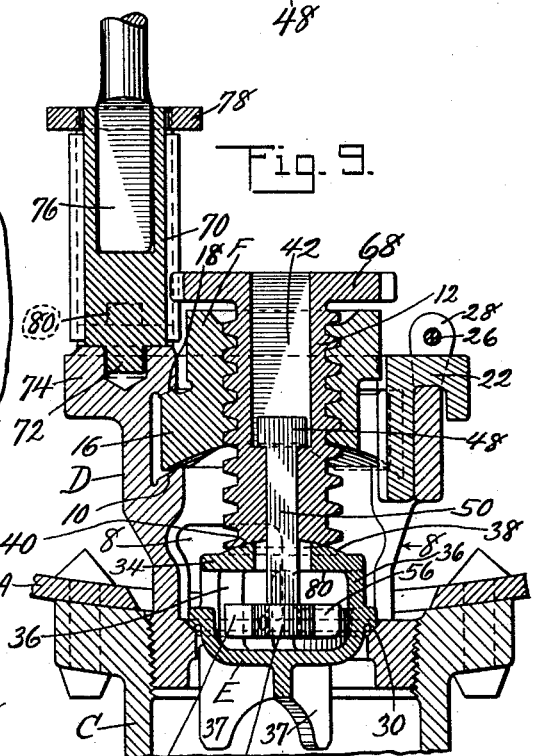

Patented Dec. 9, 1930

1,784,460

UNITED STATES PATENT OFFICE

JOHN J. McBRIDE, OF BAYONNE, NEW JERSEY, ASSIGNOR TO AMERICAN CAR AND FOUNDRY COMPANY, OF NEW YORK, N. Y., A CORPORATION OF NEW JERSEY

VALVE ASSEMBLY

Application filed May 14, 1928. Serial No. 277,574.

This invention relates generally to an improved car tank discharge means and has particular reference to a valve assembly for controlling discharge of the tank lading from a tank.

In valves of the general type shown herein, it has been found that sometimes several parts thereof will bind together due to various causes; for example, the adhesion of the tank lading with the several parts, and when it is desired to unseat the valve to permit discharge of tank lading, the valve will be fractured or some other part of the assembly will be cracked or fractured necessitating replacement of parts and a consequent added expense to the upkeep of the general assembly. This, it is believed, is due to a unitary construction of the valve and valve stem, and one object of the present invention is to eliminate the disadvantage aforesaid.

Another object of the invention is to provide a valve assembly in which the several parts thereof will be successively operated by a valve rod or the like whereby the valve assembly will not be subjected to extreme stresses and strains at one and the same time.

Another object of the invention is to provide a valve assembly for controlling discharge from a tank or the like which assembly is formed of few parts and which is strong and durable in operation.

A further object of the invention is the provision of a valve assembly in which the several parts thereof are virtually self-adjusting whereby binding thereof is eliminated and easy operation afforded should the valve rod for any reason be misalined.

Other objects and advantages of this invention will be apparent from the following description taken in conjunction with the accompanying drawings forming a part hereof, in which:

Figure 1 is a section through a car tank showing the discharge outlet and the valve arrangement of the present invention;

Fig. 2 is a sectional view of a portion of a discharge outlet showing a valve assembly in section secured thereto;

Fig. 3 is a sectional view on the line 3—3 of Fig. 2;

Fig. 4 is a top plan view of the valve assembly shown in Fig. 2;

Fig. 5 is a sectional view on the line 5—5 of Fig. 2;

Fig. 6 is a sectional view of the valve assembly with the parts thereof arranged in a different position than that shown in Fig. 2; the valve rod having been actuated;

Fig. 7 is a sectional view on the line 7—7 of Fig. 6;

Fig. 8 is a sectional view of the valve assembly, showing the valve in elevated or lifted position to uncover the ports of the valve cage;

Fig. 9 is a sectional view of a modified form of valve assembly; and

Fig. 10 is a top plan view of the modification shown in Fig. 9.

Referring now more particularly to the drawings, in which similar characters of reference designate similar parts in the several views, a tank of any desired form is shown at A, the same having a dome B, a discharge outlet C and a valve cage D.

The valve cage D is preferably of the form shown clearly in the drawings; being externally threaded at its lower end as shown at 2, whereby the cage is secured to the discharge outlet C. The cage is further provided with reinforced perforated lugs 4 which take screws 6 for an obvious purpose. The cage D is provided with ports 8 to permit fluid or other tank lading to pass into the cage and past a valve E hereinafter described, into the discharge outlet C.

The cage D is generally tubular in form as shown, and the interior surface thereof is provided with a bevelled shoulder 10 which supports an actuator F in the form of a sleeve nut which is threadedly engaged with and supports a valve screw 12. The actuator F is clearly shown in Figs. 2, 5, 6 and 8 and comprises an internally threaded tubular sleeve 14 having spaced projections or legs 16 at its lower end, the lower surfaces of which legs are arcuately bevelled to seat upon the correspondingly bevelled shoulder 10. As more clearly seen in Fig. 5, three projections have been provided, but this is merely by way of example, as obviously any desired or preferred number of projections may be formed at the lower end of the sleeve nut to accord with any desired construction. To retain the actuator on the shoulder 10, the upper edge of the valve cage is provided with a plurality of inwardly extending spaced flanges 18, the lower edges of which are bevelled and are adapted to be contacted with by the correspondingly bevelled upper edges of the legs 16. At this point, attention is called to the fact that the lower surface of the actuator, including the projection 16, and the upper edges of the projections, together with the shoulder 10 and the bevelled surfaces of the flanges 18, are all arcuately bevelled, the arcs of which are struck from the same center. This arrangement has been designed for the specific purposes to be hereinafter pointed out. The flanges 18 and the shoulder 10, define, in effect, several recesses into which the legs 16 extend, and these recesses are of such height that sufficient clearance is provided to permit easy assembling of the actuator in the cage and a very limited movement of the actuator in said recesses in order to prevent binding, but the recesses are of insufficient height to permit substantial vertical movement of the actuator, with respect to the cage in the recesses, as no substantial movement of the actuator is desired or contemplated for the purpose of the present invention.

The actuator F is capable of rotary reciprocation in the cage, and to limit such reciprocation, the legs of the actuator are adapted to contact with a stop member 22 supported by the upper edge of the valve cage in a recess formed therein, as shown at 22. The stop member is retained against vertical displacement by a key 26 arranged in upstanding lugs 28 formed with the upper edge of the valve cage adjacent the recess therein.

The valve cage D is further provided with a tapered valve seat 30 which normally supports the valve E heretofore mentioned. The valve E is a substantially hollow structure comprising the lower dish-shaped portion 32 and the top portion 34 united or connected by oppositely disposed vertical webs 36. The lower portion of the valve is provided with depending wings 37 which serve to guide the valve to its seat as well as to provide a means by which the valve may be freed from its seat in the event that the same becomes stuck thereto for any reason.

The top portion 34 of the valve is formed with a convex area 38, the arc of which is formed from the same center as the arcs of the upper and lower surfaces of the legs 16, and the lower end of the valve screw 12 is concave as at 40 to nicely fit the convex surface of the valve top portion 34. From the arrangement just described, it can be seen that the actuator F and the valve screw 12 are capable of lateral shifting within the cage; the arcs of the upper and lower edges of the legs 16 and the lower concave end of the valve screw 12 being struck from the same center. During such lateral shifting, it will be apparent that either the upper or lower edges of the legs 16 will slide on the under surfaces of the flanges 18 or the bevelled surface of the shoulder 10, as the case may be and the lower end of the valve screw 12 will slide over the convex area of the head portion of the valve E. This permits the desired amount of flexibility of the entire assembly, which may be necessary should the valve rod hereafter described be positioned such as to be misalined with the assembly as hereinafter described.

The valve screw 12 is provided with a vertically arranged squared recess 42 into which the lower squared end 44 of a valve rod 46 extends, and said squared end rests upon the head 48 of a connector 50 which is arranged through a squared aperture in the lower end of the valve screw and which extends into the interior of the valve E through an enlarged opening 52 formed in the top portion of the valve. The recess 42 is so designed as to size that the squared end 44 of the valve rod 46 fits substantially tightly therein in order to afford a prompt and immediate operation of the valve assembly upon rotation of the valve rod. The valve rod extends upwardly into the dome B and is mounted within a bracket 47. Obviously, in quantity production, it oftentimes happens that the bracket 47 will not be accurately positioned to a degree such that the valve rod 46 will be altogether perpendicular and rotation of the valve rod may take place at an angle with respect to the perpendicular. By the arrangement of the actuator and valve screw, such misalinement does not hinder the operation of the device but the valve rod may function satisfactorily because of the arrangement of the actuator and valve screw which permits the lateral shifting above described. Secured to the lower end of the connector 50 by a suitable fastener 53 is a nut 54 having oppositely disposed wings 56; the nut thus being arranged within the valve E intermediate the top and bottom portions thereof, as will be apparent.

The vertical webs 36 of the valve E are provided with internally arranged sharply defined recesses 58, 60 and 62 which form oppositely arranged abutments 64 and 66 respectively which are so arranged as to be contacted with by the wings 56 of the nut 54 upon rotation of the connector 50. The recesses 60 are provided for the purpose of maintaining a sufficient clearance for the assembly of the nut 54 with the connector 50.

Figs. 9 and 10 disclose a modified form of the invention in which the valve E is actuated by suitable gearing. In the form shown in these figures, the screw 12 is provided with a gear 68 at its upper end, the teeth of which are engaged by an elongated pinion 70, the lower end of which is provided with a bearing 72 mounted for rotation in a shelf 74 formed preferably with the valve cage D. The pinion is recessed to receive the squared lower end 76 of a valve rod, as shown, and is mounted in the pinion bracket 78 secured to the shelf 74 by suitable fasteners 80.

With the device of the present invention assembled as shown in Figs. 1 and 2, it is apparent that the valve closes the discharge outlet against the passage of the tank lading. When it is desired to unload the tank, the valve rod 46 is actuated thereby rotating the valve screw 12 as will be apparent. The valve screw 12, as before described, is threadedly engaged in the actuator F, and when the valve E is in seated position, the upper edges of the legs 16 are in engagement with the lower surfaces or edges of the flanges 18 as clearly shown in Fig. 2. The legs 16 have been designated for purposes of description as 82, 84 and 86 respectively in Fig. 5, and it can be seen in said figure that with the parts assembled as shown in Fig. 2, the leg 86 is in contact with the stop member 22. Now upon rotation or actuation of the valve rod 46 as before described and the resultant rotation of the valve screw, it will be apparent that the actuator F will be rotated also until the leg 84 contacts with the opposite side or edge of the stop member 22. This operation, it will be apparent, will initially release the actuated parts and if the actuator F was previously stuck to the valve cage for any reason, it will be released and rotated as just described until the lower surfaces of the legs 16 engage with the shoulder 10 whereupon the valve screw will be lifted due to its rotation within the actuator F. It will be apparent that rotation of the valve screw 12 will free the lower end thereof from the upper surface of the valve under normal conditions. Should the valve screw be stuck to the valve, obviously the valve will rotate therewith, but this is by far the exception as usually the weight of the tank lading which is within the valve cage and surrounds the valve and its screw will be sufficient to prevent the valve from being rotated with the valve screw, and therefore the valve screw will be freed from its engagement with the valve and lifted from the latter as shown in Fig. 6. During the operations just described, it is apparent that upon the initial lifting of the valve screw, there is no movement of the valve itself. This is considered important for the reason that in valve assemblies of this general type, it has been found that when the parts are so arranged that rotation of the valve rod reacts upon all parts simultaneously, sometimes certain parts are fractured or broken due to the normal binding thereof or due to sticking of the parts as the result of the adhesion of the tank lading therewith or the congealing of said lading. In the valve of the present invention, said disadvantages are eliminated by actuating the several moving parts in succession rather than in unison. So, actuation of the valve rod first actuates the sleeve nut 12 and the actuator F to free the valve screw from its engagement with the valve E. The connector obviously is rotated and during partial rotation of the valve screw and the initial release of the joint between the valve and the valve screw, it will be apparent that the wings 56 of the nut 54 will move from the position shown in Figs. 2 and 3 where they are in contact with the abutments 66, to the position shown in Fig. 7; that is, until they contact with abutments 64. Continued rotation of the valve rod will rotate or grind the valve on its seat, thus freeing the valve from its seat if the valve be stuck to the seat, and the wiping of the valve will continue until the wing nut 54 is elevated sufficiently to engage the under surface 80 of the top portion of said valve, whereupon continued rotation of the valve rod will lift the valve E from its seat, as shown in Fig. 8 and permit discharge of the tank contents through the cage into the discharge outlet C. As clearly shown in the drawings, the actuator overlies the valve so that the latter may contact therewith when elevated, the actuator thus serving as a stop to limit the rise of the valve.

Referring now to the type of valve assembly shown in Figs. 9 and 10, operation of the valve rod will cause a rotation of the pinion 70 and an actuation of the valve screw shown in said figures; the teeth of the pinion operating the gear 68 to effect a lifting of the valve screw. Aside from this, the operation of the type of valve shown in Figs. 9 and 10 is identical with that of the remaining figures in the case and no further description thereof seems to be necessary.

In closing the valve, the valve rod 46 of Figs. 2 and 8 is reversely rotated to lower the valve screw 12 and the valve E; the valve screw working through the actuator F until the valve is seated within the cage. When the valve is seated, continued rotation of the valve rod will cause the wings of the nut 54 to leave the abutments 64 and engage the abutments 66 and grind the valve on its seat until the valve screw contacts with the concave area of the top portion of the valve. Further rotation will tightly secure the valve to its seat as will be apparent and will also elevate the actuator F until the upper edges of the legs contact with the lower edges of the flanges 18; the actuator F being rotated until the projection 86 contacts with the stop member 22, and when this has taken place the entire assembly is in sealing position.

From the above description, it is believed that the construction and operation of the device will be fully apparent to those skilled in the art when the said description is considered in conjunction with the accompanying drawings.

It is to be understood that the drawings are for illustrative purposes only and that various changes in the form and proportions of the device may be made within the scope of the appended claims without departing from the spirit of the invention.

What is claimed is:

1. A valve assembly comprising a valve cage, an actuator in said cage and so arranged as to be capable of partial rotation, a valve screw supported by the actuator and capable of vertical movement relative thereto, a valve normally seated in the cage and normally retained in seated position by said valve screw, means connecting said valve screw and valve to permit relative movement therebetween, and means carried by said connecting means for engaging the valve to grind the latter on its seat after partial elevation of the valve screw and to lift said valve from its seat upon continued elevation of the valve screw.

2. A valve assembly comprising a valve cage, an actuator therein, a valve screw carried by the actuator, a valve normally seated in the cage and adapted to be engaged by and disengaged from the valve screw, and means loosely connecting said valve screw and valve, said valve screw being rotatable whereby the actuator is first moved and the valve screw elevated from the valve to permit grinding of the valve on its seat and its subsequent lifting upon continued rotation of the valve screw.

3. A valve assembly comprising a valve cage, a valve seated in the cage, an actuator mounted in the cage and restrained against substantial vertical movement, a valve screw supported by the actuator and adapted to engage with and be disengaged from the valve, means supported by the valve screw for connecting the valve therewith, and means carried by said connecting means for engaging the valve after partial rotation of the valve screw to grind the valve on its seat and for lifting the valve upon continued rotation of said valve screw.

4. A valve assembly comprising a valve cage, a valve seated therein, a valve screw mounted in the cage and adapted to engage and to be disengaged from the valve, a connector supported by the valve screw and extending into the valve, means at the lower end of the connector for rotating the valve, and means for elevating the valve screw to disengage the same from the valve whereby after partial elevation of the valve screw the valve is ground on its seat and upon further elevation the valve is lifted.

5. A valve assembly of the kind described comprising a valve cage having a valve seat, a valve normally positioned on said seat, a valve screw supported in said cage and adapted to be engaged with and disengaged from the valve, and means connecting said screw and valve permitting relative movement therebetween and so formed as to grind said valve on its seat after disengagement of the valve screw from the valve.

6. A valve assembly of the kind described comprising a valve cage having a valve seat, a valve normally positioned on the seat, and means for operating said valve comprising a rotatable valve screw in the cage, and a loose connection between said valve and valve screw operative after partial rotation of the valve screw to grind said valve on its seat and to lift said valve from its seat.

7. A valve assembly of the kind described comprising a valve cage having a valve seat, a valve normally positioned on the seat, and means for operating the valve comprising a valve stem movable relative to the valve, and means connecting said stem and valve and movable with the stem to grind the valve on its seat after the commencement of movement of the stem and to lift said valve from its seat upon continued movement of the stem.

8. A valve assembly comprising a valve cage having a valve seat therein, a valve normally supported on the seat, a valve screw in said cage adapted to be engaged with or disengaged from said valve, an actuator in said cage in which the valve screw rotates, and means connecting said valve screw and valve for grinding said valve to its seat after partial rotation of the valve screw and for lifting said valve from its seat following grinding thereof and upon continued rotation of the valve screw.

9. In a valve assembly, a valve cage, a valve normally seated therein, operating means in said valve cage for grinding said valve on its seat and for lifting said valve after grinding, and a valve rod connected to said operating means, said means being horizontally shiftable in said cage relative to the valve to compensate for misalinement of said valve rod.

10. In a valve assembly, a valve cage, a valve normally seated therein, a horizontally shiftable actuator in the cage, a rotatable valve screw supported by and vertically movable through the actuator and adapted to be engaged with and disengaged from the valve, said screw being shiftable on the valve upon shifting of the actuator, and means connecting said valve screw and valve for grinding the latter on its seat after partial rotation of the valve screw and for lifting said valve from its seat following grinding thereof and upon continued rotation of the valve screw.

11. In a valve assembly, a valve cage, a valve normally seated therein, and means in the cage loosely connected to the valve for actuating the latter after partial operation of said means, said means being horizontally shiftable in the cage to compensate for misalinement of the parts of said assembly.

12. In a valve assembly, a valve cage, a valve normally seated therein and provided with a convex area on its upper surface, a valve screw having means for loosely connecting it with the valve for operating the same and having its lower end conformed to the convex area of the valve to be engaged therewith to shift thereon and to be disengaged therefrom, a horizontally shiftable actuator supporting said screw and in which the latter is movable, said actuator being provided with arcuately beveled bearing surfaces formed on arcs having a center common with the arc of the convex area of said valve.

13. In a valve assembly, a valve cage, a valve normally seated therein, a horizontally shiftable actuator in said cage, and a valve screw having means for operatively engaging the valve and supported by and movable in the actuator, said valve screw being adapted to engage with and be disengaged from the valve and being shiftable thereon upon shifting of the actuator.

14. In a valve assembly, a valve cage, a valve normally seated therein, a horizontally shiftable actuator in said cage, a valve screw supported by and movable in the actuator and adapted to engage with and be disengaged from the valve and being shiftable thereon upon shifting of the actuator, and means connecting said valve screw and valve.

15. In a valve assembly, a valve cage having a valve normally seated therein, and means for operating said valve comprising an actuator in said cage, a valve screw engageable with said actuator and adapted to be engaged with and disengaged from the valve, operative means between said valve screw and valve and a valve rod for rotating said valve screw, said valve screw and actuator being so arranged as to be capable of horizontal shifting in said cage to compensate for misalinement thereof and of the valve rod.

16. In a valve assembly, a valve cage, a valve normally seated therein, an actuator in said cage having arcuately beveled bearing surfaces contacting with the cage, a valve screw engageable with said actuator and having its lower end curved on an arc struck from a center common to the arcs of the beveled bearing surfaces of the actuator and normally seated on the valve, and means connecting the valve screw and valve whereby the latter is actuated after partial operation of the valve screw, said means permitting horizontal shifting of the actuator and valve screw relative to the valve.

17. In a valve assembly, a valve cage, a valve normally seated therein, a horizontally shiftable partially rotatable actuator in said cage, a valve screw supported by and rotatable in said actuator and adapted to be engaged with and disengaged from the valve, said screw being shiftable with the actuator relative to the valve, a connector supported by the valve screw and extended into the valve, and means on the connector for engaging the valve to grind the latter on its seat after partial rotation of the valve screw and for lifting the valve from its seat upon continued rotation of the screw.

18. In a valve assembly, a valve cage, a valve therein, an actuator in said cage and capable of vertical and lateral shifting therein, and a valve screw supported by and movable in the actuator and adapted to engage with and to be disengaged from the valve and having means for operatively connecting it with the valve.

19. In a valve assembly, a valve cage, a valve normally seated therein, an actuator in said cage and capable of lateral shifting therein, a valve screw carried by the actuator and adapted to engage with and be disengaged from the valve, and means connecting the valve screw and valve to elevate the latter after the valve screw has been disengaged from the valve.

20. In a valve assembly, a valve cage, a valve therein, a valve screw, means loosely connecting the valve screw and valve, a valve rod for actuating the valve screw, and means in said cage to which the valve screw is connected and by which said valve screw is supported independently of the valve, said last named means being shiftable with respect to the cage to compensate for misalinement of the valve rod.

21. In a valve assembly, a cage, a valve therein, a valve screw independent of said valve but adapted to engage the latter to secure it in seated position, a loose connection between said valve and valve screw, a valve rod for operating the valve screw, and means in said cage for supporting the valve screw, said means being capable of vertical shifting and partial rotation upon actuation of the valve screw and being so mounted as to permit lateral shifting to compensate for misalinement of the valve rod.

22. In a valve assembly, a valve cage, a valve therein, a valve screw independent of said valve, a valve rod engaged with the valve screw, an actuator for supporting the valve screw, means connecting the valve screw and valve to elevate the latter after partial actuation of the valve screw, the valve screw being so formed as to properly engage the valve in the event of misalinement of the valve rod and said actuator being shiftable to compensate for misalinement of the valve rod.

23. In a valve assembly, a valve cage, an actuator therein capable of limited vertical and lateral shifting, a valve screw movable in said actuator, means for actuating said valve screw, a valve, and operative means connecting the valve and valve screw and permitting relative movement therebetween, said actuator overlying the valve whereby to limit the upward movement of the latter.

24. In a valve assembly, a valve cage, a valve, a valve screw loosely connected to the valve and capable of limited movement relative thereto, and an actuator in the valve cage for supporting said valve screw, said actuator overlying the valve to limit the upward movement thereof, said actuator being capable of limiting shifting to compensate for misalinement of the parts of said assembly.

25. In a valve assembly, a valve cage, a valve screw and a valve loosely connected thereto, a valve rod connected to the valve screw, and means for adjustably supporting said valve screw comprising an actuator in said cage and capable of shifting to compensate for misalinement of the valve rod relative to the valve.

26. In a valve assembly, a valve cage, a valve screw and a valve loosely connected thereto to permit relative movement therebetween, and an actuator to which the valve screw is adjustably connected arranged in the valve cage and capable of limited shifting therein.

27. In a valve assembly, a valve cage, a valve screw and a valve loosely connected thereto to permit relative movement therebetween, and an actuator to which the valve screw is adjustably connected arranged in the valve cage and capable of limited vertical and lateral shifting.

28. In a valve assembly, a valve cage, a valve screw and a valve loosely connected thereto to permit relative movement therebetween, and an actuator to which the valve screw is adjustably connected arranged in the valve cage and capable of limited vertical and lateral shifting and partial rotation.

In witness whereof I have hereunto set my hand.

JOHN J. McBRIDE.